INVENTOR.
WILLIAM L. CRAIG

Sept. 15, 1970  W. L. CRAIG  3,528,836
PIGMENT OR FILLER AND MATERIALS AND PROCEDURES
FOR MAKING THE SAME
Filed March 29, 1965  4 Sheets-Sheet 2
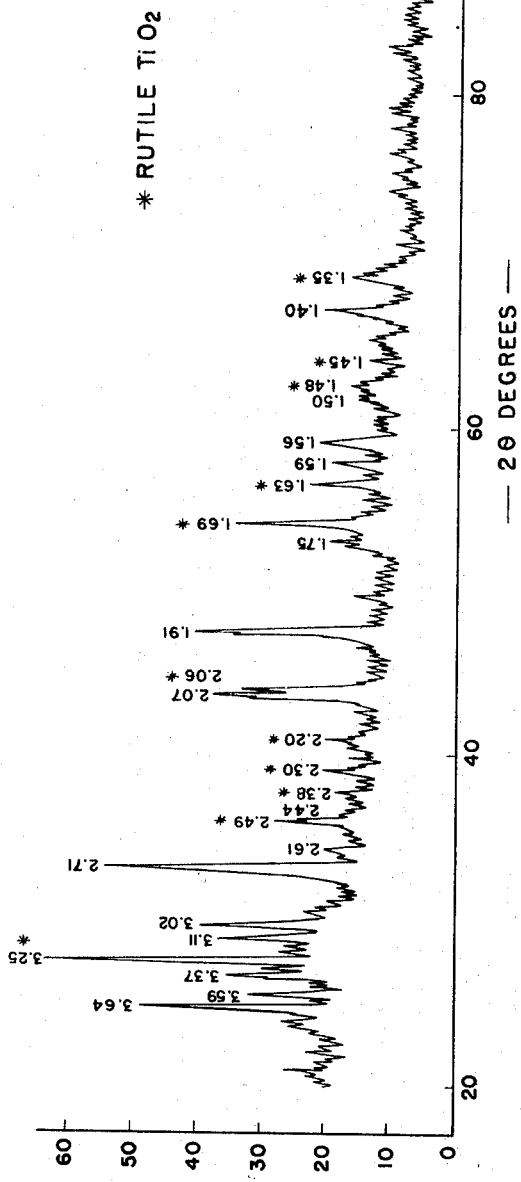
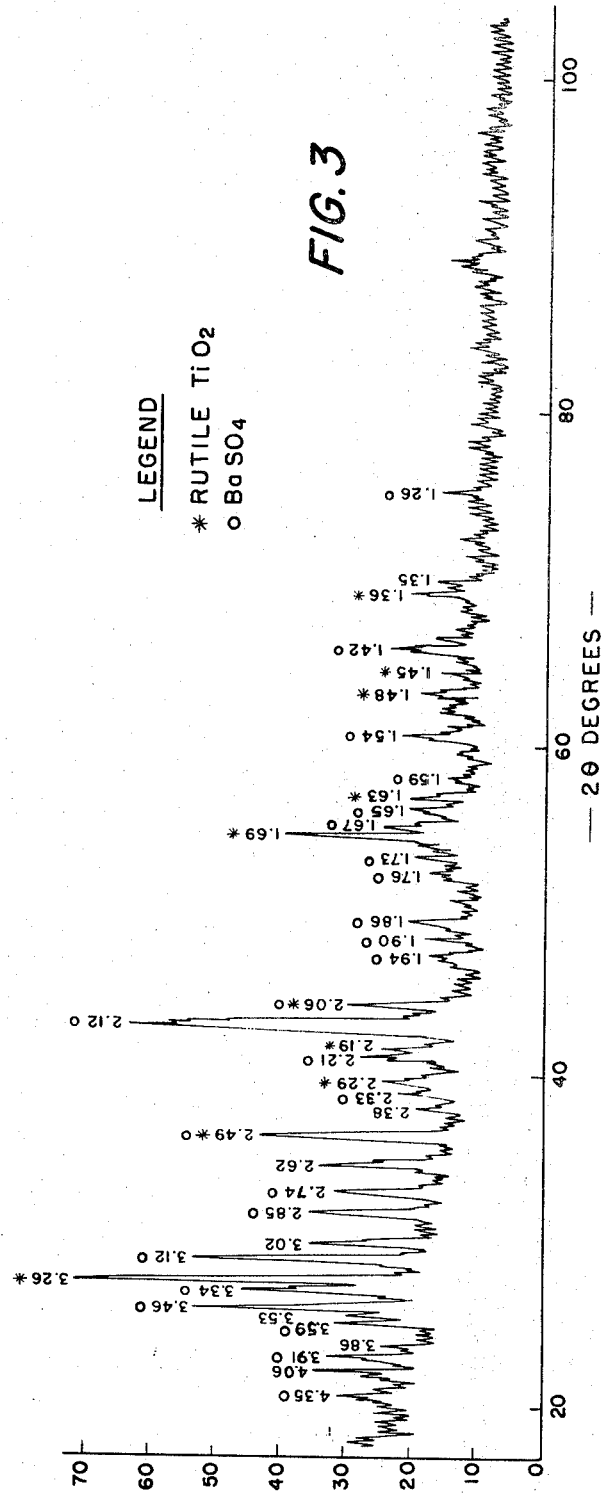
INVENTOR.
WILLIAM L. CRAIG
BY
his ATTORNEYS

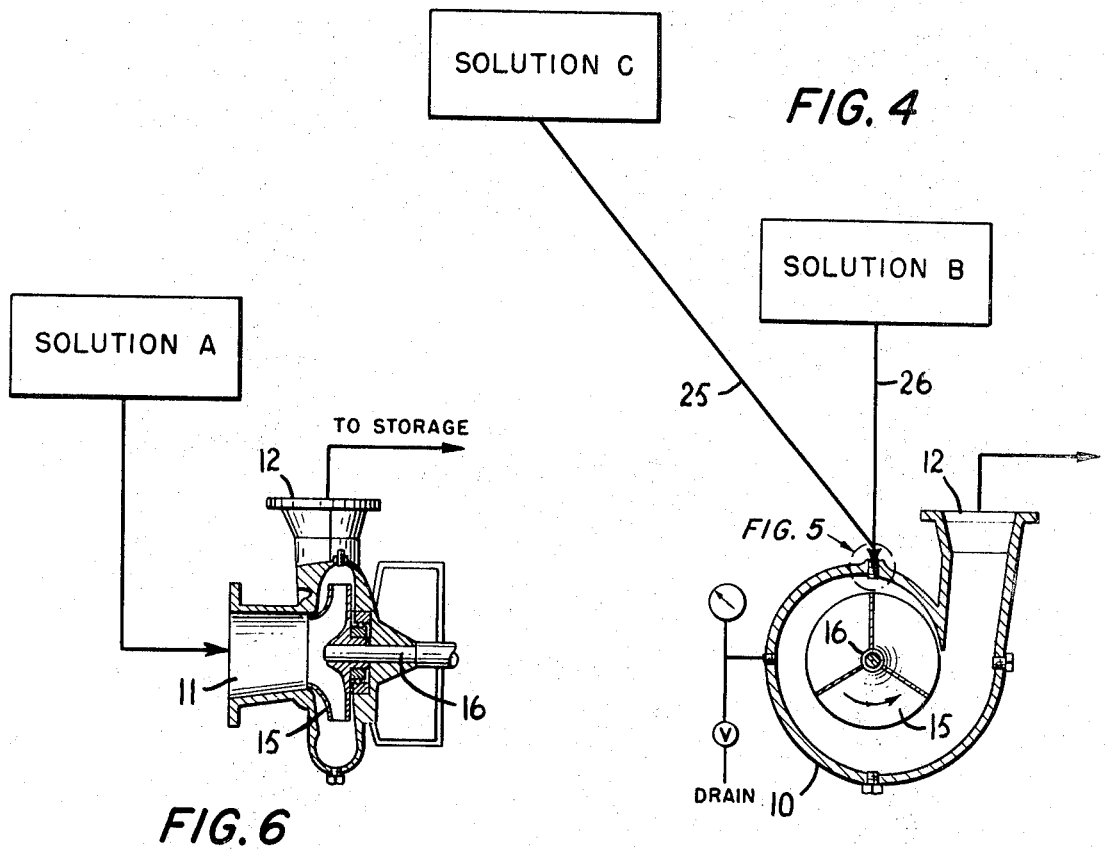
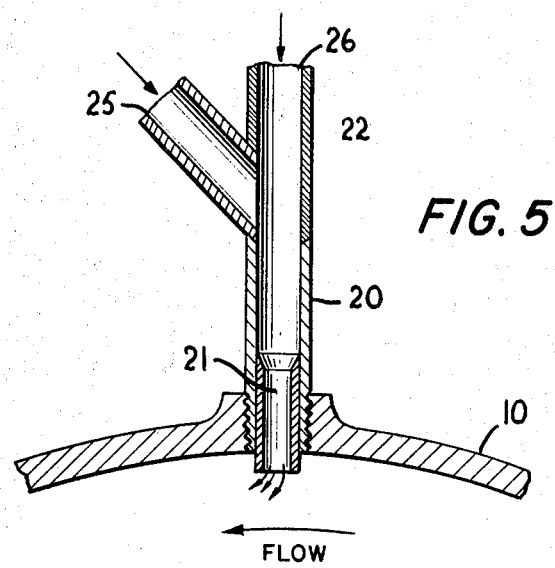

United States Patent Office 3,528,836
Patented Sept. 15, 1970

3,528,836
PIGMENT OR FILLER AND MATERIALS AND PROCEDURES FOR MAKING THE SAME
William L. Craig, Westport, Conn., assignor to R. T. Vanderbilt Company, Inc., New York, N.Y., a corporation of New York
No Drawing. Filed Mar. 29, 1965, Ser. No. 447,116
Int. Cl. C09g 23/04; C09c 1/02, 1/36
U.S. Cl. 106—300                                          13 Claims

ABSTRACT OF THE DISCLOSURE

The present application discloses a complex composition consisting essentially of $TiO_2$, $SiO_2$ and CaO made by precipitation from an acid solution of titanyl sulfate containing calcium and silicate ions dissolved therein, by mixing such solution with an alkaline solution under conditions of high shear.

The application also discloses a complex composition consisting essentially of $TiO_2$, $SiO_2$, CaO and $BaSO_4$ made by precipitation from an acid solution of titanyl sulfate containing calcium and silicate ions dissolved therein, by mixing such solution with an alkaline solution containing barium ion dissolved therein, under conditions of high shear.

The application also discloses the method of producing a $TiO_2$ pigment of increased rutile content by the sulfuric acid process, which comprises introducing into the high shear zone adjacent a rapidly rotating impeller an aqueous acid solution of titanyl sulfate, introducing into said zone an aqueous alkaline solution of an alkali metal in an amount sufficient substantially at least to neutralize said titanyl sulfate solution and precipitate $H_2TiO_3$, withdrawing from said zone effluent containing said precipitated $H_2TiO_3$, removing said $H_2TiO_3$ from its mother liquor, and drying and calcining to $TiO_2$.

---

This invention relates to pigments or fillers containing titanium dioxide, and to procedures and materials used in making such pigments.

Titanium dioxide has been used in the paper industry for many years as an opacifying pigment. One of the problems connected with the use of this pigment in a paper mill system is the requirement that the pigment be finely dispersed and uniformly distributed throughout the paper. Titanium dioxide particles are manufactured having mean particle size of about 0.25 micron. This particle size is carefully controlled by the manufacturer to produce the maximum light reflectance or opacity. When the pigment is used in a paper mill system it is difficult to maintain the proper dispersion because the small particles of $TiO_2$ must be flocculated in order to retain them in the fiber matrix. Such flocculation or piling reduces the desired optical efficiency of the titanium dioxide pigment.

The dispersion problem has been studied by pigment chemists for many years in an attempt to obtain a better pigment for the paper industry. Various pigment extensions were made by physically blending $TiO_2$ with other inorganic compounds such as barium sulfate, calcium sulfate, calcium silicate, aluminum silicate and hydrated silicates. Such extended pigments were used throughout the paper industry for many years. However, the purchase of such materials is not favored because in some instances it has been found more economical merely to blend the individual components of the mixture at the paper mill.

Similarly, in the paint, rubber and other fields, $TiO_2$ has been blended with extenders such as $CaSO_4$, $BaSO_4$, aluminum silicates to reduce the cost of the material. Such extenders serve to keep the $TiO_2$ particles separated in the matrix and reduce piling which, in turn, produces a higher degree of optical efficiency from the $TiO_2$. Although the physical extension of the $TiO_2$ particles does in some measure increase the opacity of the material such as the finished sheet of paper, rubber, paint film, etc. the efficiency of the $TiO_2$ particles is still far below their maximum capabilities.

In accordance with the present invention there is produced a complex composition consisting essentially of $TiO_2$, $SiO_2$ and CaO made by precipitation from an acid solution of titanyl sulfate containing calcium ions and silicate ions dissolved therein, by mixing such solution with an alkaline solution under conditions of high shear. According to a particular embodiment of the invention, there is produced a complex composition consisting essentially of $TiO_2$, $SiO_2$, CaO and barium sulfate made by precipitation from an acid solution of titanyl sulfate containing calcium ions and silicate ions dissolved therein, by mixing such solution with an alkaline solution containing barium ions dissolved therein under conditions of high shear. A novel aspect of the invention is the aqueous acid solution of titanyl sulfate containing calcium and silicate ions dissolved therein, which upon being neutralized with an alkali precipitates the complex $TiO_2$, $SiO_2$ and CaO. As the term is used in the specification and claims, $TiO_2$ includes both the anhydrous form and $TiO_2$ in the form of the hydrate $H_2TiO_3$.

According to the method of the invention the complexes are preferably produced by continuously introducing into a high shear zone adjacent a rapidly rotating impeller, an aqueous acid solution of titanyl sulfate containing the calcium and silicate ions dissolved therein, and simultaneously continuously introducing into said zone an aqueous alkaline solution of an alkali metal (suitably containing the barium ion dissolved therein if desired) in an amount sufficient substantially to neutralize said titanyl sulfate solution, and preferably raise the pH to a value between about 8 and 10, thereby to precipitate the desired complex. The effluent containing said precipitated complex is continuously withdrawn from the high shear zone.

The slurry containing the complex dispersed in the mother liquor is then filtered or centrifuged to recover the complex, which is thereafter dried, calcined and ground to produce the pigment having the desired particle size and suitably dispersed particles. The precipitated complex pigment will have an average particle size not greater than 0.5 micron, preferably, under optimum conditions, not greater than about 0.25 micron.

In the case of pure $TiO_2$, there is a rather critical particle size range needed to obtain maximum opacity, i.e., about 0.2–0.25 micron. With my extended pigment, however, made by the procedures described herein, and containing at least about 25% of extending material, the permissible particle size range is about 0.15 to 0.5 micron for maximum opacity. The preferred amount of extender is about 60–70%, that is, about 30–40% $TiO_2$.

It has been found that upon calcining the $TiO_2$ or the $TiO_2$ complex obtained according to the invention, a $TiO_2$ pigment is obtained (without seeding) which has a substantially higher rutile content as compared with $TiO_2$ pigments obtained by ordinary sulfuric acid procedures (without seeding). Therefore, a particular aspect of the invention resides in the method of producing a $TiO_2$ pigment having increased rutile content by the sulfuric acid process, even in the absence of $CaSiO_3$ and $BaSO_4$, by carrying out the process described under conditions of high shear, preferably by continuously introducing into a high shear zone adjacent a rapidly rotating impeller, an aqueous acid solution of titanyl sulfate, simultaneously continuously introducing into said zone an aqueous alkaline solution of an alkali metal in an amount sufficient substantially to neutralize said titanyl sulfate solution and preferably raise the pH to a value in the range of about 8-10, thereby to precipitate $H_2TiO_3$, continuousy withdrawing from the zone the effluent containing the precipitated $H_2TiO_3$, which is then removed from its mother liquor, dried and calcined to produce $TiO_2$. The calcining is carried out under known conditions.

FIG. 2 is another X-ray diffraction diagram of a $TiO_2$ pigment made according to the invention;

FIG. 3 is still another X-ray diffraction diagram of a $TiO_2$ pigment made according to the invention;

FIG. 4 is a diagrammatic section of a portion of a centrifugal pump useful in carrying out the process of the invention;

FIG. 5 is an enlarged drawing of a portion of the pump shown in FIG. 4;

FIG. 6 is a diagrammatic section of the pump shown in FIG. 4 taken along the axis of the impeller.

Figure 1:
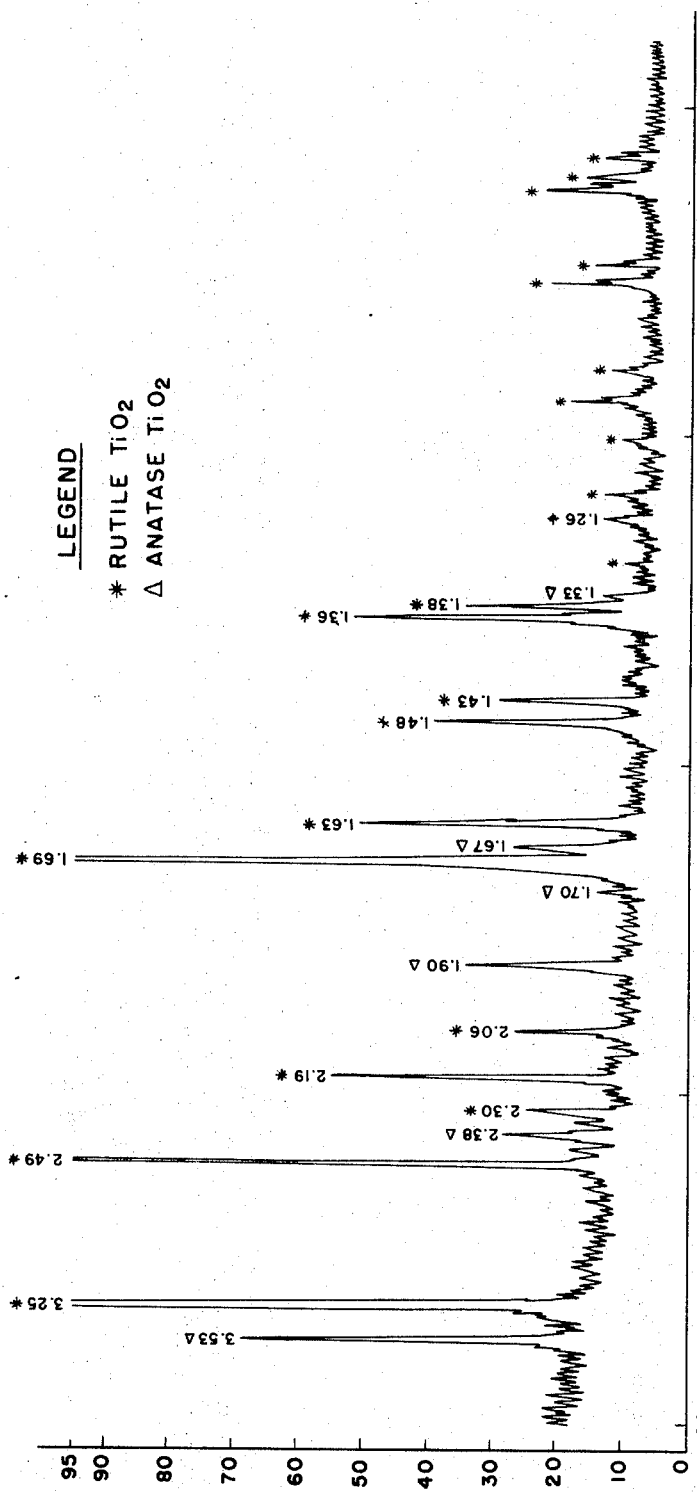
FIG. 1 is an X-ray diffraction diagram of a $TiO_2$ pigment made according to the invention.

It is not known exactly why the conditions set forth above produce the unexpected results that have been found. It is thought, however, that as the alkaline solution, suitably containing the barium ion, combines with the strongly acid titanyl sulfate solution, the following reactions may occur instantaneously and simultaneously:

(1) The titanyl sulfate instantly hydrolyzes to titanic acid ($H_2TiO_3$).

(2) The barium salt (if present) reacts with the available sulfate ions and forms an insoluble barium sulfate and the calcium ion combines with $SiO_2$ to form the hydrated calcium silicate. It is noted that under these conditions calcium sulfate cannot be formed since it is soluble.

(3) The control of the extent of shear at the point of mixing and precipitation is believed to be important. The two major controlling factors for this formation are temperature and agitation. By maintaining the rate of shear at its maximum value and the temperature at its optimum value, the ultimate fineness of the discrete particles as formed is assured.

(4) The fact that all the chemical constitutents involved in the reaction are soluble and ionized permits simultaneous double decomposition of the salts to form the insoluble complex structure.

The ratio of $TiO_2$ to the other components of the complex may be varied over a wide range. In fact, substantially pure $TiO_2$ may be made utilizing the present invention. The content of barium sulfate and calcium silicate will depend generally upon the use to be made of the pigment. For reasons of economy it will be desired to include as much calcium silicate and barium sulfate as can be tolerated since they are relatively less expensive materials. A suitable range of $TiO_2$ content for the extended pigment is about 5 to 95%, preferably about 5 to 40% $TiO_2$ based on the total weight of the complex, the remainder representing the content of CaO, $SiO_2$ and $BaSO_4$ (if present).

The ratio of the barium sulfate to the calcium silicate may also be carried, suitably within the range from about 95:5 to 5:95 by weight. Since the $BaSO_4$ is a dense material and the hydrated calcium silicate is a relatively less dense and bulky material, it is perferred, particularly from the standpoint of the fired product, to balance these characteristics of the two materials. The preferred amounts are about equal on a weight basis but acceptable qualities may be obtained in the range of about 30:70 to 70:30 of the two materials.

The techniques useful in controlling the precipitation of the pigment and the characteristics of the precipitated pigment include temperature, pH, water dilution and degree of shear. The temperature within the zone of high shear where precipitation occurs, is preferably elevated, thereby to make the reaction go more rapidly. Temperatures within the range of about 100-212° F. are suitable, but they are preferably in excess of 170° F.

The temperature of a titanyl sulfate solution before it reaches the zone of high shear, however, is governed by other factors. Excessively high temperatures will cause the titanyl sulfate to hydrolyze prematurely and the titanium to precipitate. Accordingly, the temperature of the titanyl sulfate solution is maintained below the thermal hydrolysis temperature, which is about 170° F.

The titanyl sulfate solution will, of course, be strongly acid. The pH will generally be about 1.0 or less, and low enough to keep the titanium and the calcium and the silicate to be added, in solution. The calcium chloride solution and the sodium silicate solution are added to the strongly acid titanyl sulfate solution and the components are mixed together. Although the solution is concentrated with respect to sulfuric acid, the $TiO_2$ content is only about 20% that is about 0.3 gram per cubic centimeter. The solution is then diluted with water, preferably hot water, to reduce the $TiO_2$ concentration to below about 10%, preferably about 2% or lower. The diluted hot solution is added as soon thereafter as practical to the high shear zone.

Although the reaction may be carried out using the concentrated titanyl sulfate solution, the dilution affords easier control of the reaction to produce the desired product.

The type of sodium silicate employed is not critical. However, it is preferred to use a sodium silicate that has a high $SiO_2$ content, inasmuch as it is the $SiO_2$ which will appear in the final product. A suitable material is $Na_2O$-3 to $4SiO_2$. Other alkali metal silicates, such as potassium silicate may be used. The use of calcium chloride is not critical and, in fact, other soluble and compatible calcium salts may be used.

The ratio of CaO to $SiO_2$ in the final complex will depend, of course, upon the ratio of calcium to silicate added to the titanyl sulfate solution. This is a factor which is subject to wide variation depending upon the qualities desired in the final product. For example, the more dense $CaSiO_3$, in which the ratio of CaO to $SiO_2$ is 1:1 may be formed. This may provide advantages, particularly where little or no $BaSO_4$ is present. It is preferred, however, to have a relatively high ratio of $SiO_2$ to CaO, that is above about 3:1, which is a less dense and more bulky material.

Although sodium hydroxide is preferred for reasons of economy, other strong alkalies, particularly alkali metal alkalies such as potassium hydroxide may be used. The temperature of the caustic solution before it reaches the mixing zone is not critical unless barium salt is present. In the latter event, the time and the temperature of the alkaline solution containing the barium salt are controlled between the point of mixing the barium salt with the alkali and the high shear precipitating zone to prevent precipitation of barium hydroxide. Preferably the barium salt is added just before the zone of high shear, and the temperature of the alkaline solution is maintained at about 180-200 F. Barium chloride is preferred but other soluble and compatible barium salts may be used.

The following examples are presented to illustrate the invention, the parts expressed being on a weight basis unless otherwise indicated.

EXAMPLE 1

One source used for the titanium was a titanium bearing iron slag known as Sorel slag. This slag contains about 75% $TiO_2$ and approximately 8% iron (FeO). The following components and materials were used in preparing the ore.

| Components: | Parts |
|---|---|
| Ilmenite (Sorel) ore | 75 |
| Concentrated $H_2SO_4$ (96%) | 225 |
| Dextrin | 0.45 |
| 0.1 N $H_2SO_4$ | 250 |
| $As_2O_3$ | 0.13 |
| FeS | 0.18 |

The ore was ground in a ball mill to a fineness that would pass through a 200 mesh screen. The correct amount of ground ore was then placed in a three-necked flask and the concentrated sulfuric acid was added to the flask. A mercury seal agitator system was inserted in the center neck of the flask, a water condenser in another neck of the flask, and a 400° C. thermometer in the remaining neck of the flask. The sulfuric acid ilmenite slurry was heated under constant agitation to 125° C. At this point the dextrin was added to prepare for the exothermic reaction. The heating was continued until a temperature of 220° C. was reached at which point the slurry formed into a solid cake. The cake was allowed to cool to 60° C. and the correct amount of 0.1 N $H_2SO_4$ was added to the flask and the cake was dissolved into solution. The correct amount of $As_2O_3$ was then added and allowed to mix for 15 minutes. Then the FeS was added and mixed well for 30 minutes. The arsenic and the iron treatments were used to aid in the clarification of the liquid. About 2 liters of distilled water were added to the mixture to assist in filtering, and the liquid was filtered in a Buchner system with an acid filter paper to remove undigested sludge.

At this point the titanium and iron were in complete solution and the liquor was ready for the next processing step. The iron in the liquor (as ferrous sulfate) was completely soluble in extreme dilutions, whereas the titanyl sulfate hydrolyzes on dilution to $H_2TiO_3$ which is an insoluble precipitate. Therefore the iron was removed by the following procedure.

One volume of the liquor was slowly added to ten volumes of boiling water, the titanyl sulfate instantly hydrolyzed to titanic acid ($H_2TiO_3$). The mixture was filtered and thoroughly washed in a Buchner system. The filtrate contained the ferrous sulfate and was discarded. An amount of sulfuric acid equal to the sulfuric acid content of the original liquor was slowly added to the wet filtered cake of $H_2TiO_3$ in a 4 liter beaker, a little bit at a time under continuous mixing. The heat of the solution is usually sufficient to raise the temperature to approximately 125° C. at which point the titanic acid reverts to the titanyl sulfate; if not, heat is added slowly while mixing continuously. At this point the liquor was purified and contained only titanyl sulfate. This liquor was referred to as "black liquor." It contained the equivalent of about 0.144 gram of $TiO_2$ per milliliter and at this point was ready to receive the other inorganic chemicals in preparation for the final precipitation of the complex. Other procedures known in the prior art may be used for preparing the purified (iron free) black liquor.

1200 milliliters of water at 140° F. were added to 42 ml. of black liquor; 30 ml. of a calcium chloride solution (10% $CaCl_2$ by volume) were then added; 40 ml. of a sodium silicate solution (18.5% $Na_2O-3.25$ $SiO_2$ by volume) were added to complete the black liquor preparation. This solution was strongly acidic and contained titanium, silicon dioxide and calcium, all in solution in the sulfuric acid. The black liquor was now ready to be precipitated to produce the desired complex pigment.

To 1600 ml. of water at 200° F. were added 53.6 ml. of a barium chloride solution (10% $BaCl_2$ by volume). 215 ml. of 5 N NaOH solution was prepared. The diluted black liquor solution (1312 ml.) was placed in a high shear reactor, that is a Waring type commercial blender Model CB-3, 1 gallon capacity, 14,500 r.p.m., ½ HP. The black liquor in the reactor was placed under shear and the 5 N caustic solution was quickly added to the barium chloride solution and this mixture was added as fast as possible to the reactor. This technique produced an instantaneous reaction with all of the available compounds and the insoluble pigment precipitate was thereby formed. The precipitated pigment was thoroughly washed and filtered in a Buchner system and dried in a low temperature oven (175° F.).

The pigment was refined as follows. After the reacted pigment was thoroughly washed and dried, it was ground in a hammermill to reduce the agglomerates to an optimum particle size. The grinding was controlled to produce a pigment having less than 0.1% grit on a 325 mesh screen. Samples of the pigment were calcined in a furnace to determine the optical properties of the particle after loss of the water of crystallization. Firing is suitably carried out in a muffle furnace from 400 to 2200° F. preferably at about 1800° F. All of the combined water (15% ignition loss) was removed at temperatures below 600° F. The calcined samples were again ground in the hammermill to the above-mentioned specification. The following physical and chemical properties were determined in the product:

G. E. Brightness—90+
Loss on ignition—approximately 15%
Assay—approximately 33% $TiO_2$ (as $H_2TiO_3$); 33% $CaO.4SiO_2.xH_2O$ (where $x$ varies between 3 and 4); 33% $BaSO_4$ Handsheets of paper were made and tested in accordance with the following procedure.

A sufficient amount of 3% consistency bleached sulphite stock (about 350 C.S.F. TAPPI Specification T227m–58) to contain 20 gm. of bone dry fiber was weighed out and put under agitation. To this concentrated stock there was added 4 cc. of a 5% rosin size solution (1% on the weight of the fiber), a sufficient amount of the ground pigment slurry to contain 1.2 gm. of dry pigment (6% on the weight of the fiber), and 8 cc. of a 5% iron-free alum solution (2% on the weight of the fiber) in that order, allowing 15 minutes of mixing after each addition. This concentrated stock was diluted to a total volume of 7,600 cc. in a large pail with filtered tap water and the pH was adjusted to 4.0–4.5 with 1% sulfuric acid. 590 cc. aliquots of this stock were put under mild agitation and 7.5 cc. (1 pound/ton based on 1.5 gm. of fiber) of a 0.01% Vanzak RA (a high molecular weight synthetic polymer cationic retention acid) solution was added and allowed to mix slowly for 2 minutes. The stock was then added to the mold, the pH adjusted to 4.0–4.5 with a 1% sulfuric acid solution, and the handsheets prepared following TAPPI conditions. The sheets were pressed, dried and conditioned overnight before testing. The TAPPI brightness of the sheets and the opacity of the sheets were measured and found to be acceptable.

EXAMPLE 2

The black liquor was prepared according to the procedure described in Example 1 and contained 0.106 gm. of $TiO_2$ per ml.; 1200 ml. of water at 140° F. were added to 170 ml. of the black liquor; 5 ml. of a calcium chloride solution (10% $CaCl_2$ by volume) were then added; 7 ml. of a sodium silicate solution (18.5% $Na_2.O3.25$ $SiO_2$ by volume) were added to complete the black liquor preparation. This solution was strongly acidic and contained the titanium, silicon dioxide and calcium, all in solution in the sulfuric acid. The following procedure was used to initiate the formation of the precipitated pigment.

(1) 9 ml. of a barium chloride solution (10% $BaCl_2$ by volume) were added to 250 ml. of water at 130° F.

(2) 1100 ml. of 5 N NaOH solution were added to 500 ml. of distilled water and the solution was heated at 200° F.

(3) The treated black liquor solution was placed in a high shear reactor of the Waring type described in Example 1.

(4) The black liquor in the reactor was placed under high shear, that is the agitator of the blender was operated at maximum speed and the 5 N caustic solution along with the barium chloride solution were added simultaneously to the reactor.

The foregoing procedures produced an instantaneous reaction with all of the available compounds and the insoluble pigment particles were formed at the prevailing pH which was about 10.0. The precipitated pigment was thoroughly washed and filtered on a Buchner system and dried at a low temperature hot air circulated oven (175° F.). The pigment was ground in a mortar and pestle to a relatively fine particle size. Samples were then calcined in a furnace to determine the optical properties of the particles after the loss of the water of crystallization. The calcined samples were then wet-ground in a ball mill for 72 hours. The grit was controlled to produce a pigment having less than 0.1% grit on a 325 mesh screen. Handshets were prepared according to the procedure described in Exampe 1. The results are presented in the following Table I (under the heading Test No. 2) together with similar data obtained by using other $TiO_2$ pigments.

EXAMPLE 3

Following the procedure described in Example 1 a composite pigment was made containing 38% $TiO_2$, 31% $BaSO_4$ and 31% $CaO.4SiO_2$.

The product of Example 3 and two of the products from Example 2, that is Tests Nos. 2 and 3, were examined by X-ray diffraction using a standard Norelco high angle automatic diffractometer, utilizing nickel filtered copper radiation. The charts obtained are presented herewith as FIGS. 1, 2 and 3. The instrument operated at 40,000 volts, and 20 milliamps plate or tube current. The divergent slit which meters the X-ray beam from the tube has 4° of arc. The receiving slit between the source and the sample has an aperture of 0.006 inch. These provide a nearly point source of X-rays for impingement

TABLE I

|  | Test Number | | |
| --- | --- | --- | --- |
|  | 1 | 2 | 3 |
|  | Control, 100% $TiO_2$ | 80% $TiO_2$, 10% $CaO.3.8 SiO_2$, 10% $BaSO_4$ | 100% $TiO_2$ |
| pH at preparation | 1.5 | 11.0 | 11.0 |
| Firing temperature, °F | 1,600 | 1,600 | 1,600 |
| Handsheet stock | (Bleached Sulphite) | | |
| Percent size | 1 | 1 | 1 |
| Percent alum | 2 | 2 | 2 |
| Percent filler | 6 | 6 | 6 |
| Percent Vanzak RA | (1 lb./ton based on 1.5 gm. of fiber weight) | | |
| pH to pail | 4.1 | 4.1 | 4.1 |
| pH to mold | 4.2 | 4.2 | 4.2 |
| Handsheet tests: | | | |
| Basis weight (25-38-500) | 43.6 | 52.2 | 48.4 |
| TAPPI brightness | 75.4 | 79.1 | 75.9 |
| TAPPI opacity | 86.5 | 88.1 | 87.7 |
| Percent $TiO_2$ in sheet | 4.43 | 3.65 | 4.33 |
| Determination of the Pigment Efficiency Value | | | |
| SX value | 2.83 | 3.27 | 3.01 |
| Corrected SX value (50 lb. basis weight) | 3.10 | 3.14 | 3.12 |
| Corrected opacity (50 lb. basis weight) | 88.6 | 87.2 | 88.0 |
| Pigment efficiency value | .700 | .860 | .724 |

Test No. 1 is a pure $TiO_2$ prepared from the original black liquor by mixing the black liquor with boiling water with moderate agitation. Test No. 3 is a product prepared in the same way as Test No. 2 (high shear mixing) with the exception that no calcium chloride, sodium silicate or barium chloride were added.

The data appearing at the lower part of Table I under the heading "Determination of the Pigment Efficiency Value" are calculated values to correct for differences in the basis weight of the three samples. The conversions were made by standard procedures as follows:

By the standard procedure described in TAPPI Standard T425m "Opacity of Paper," using a Bausch & Lomb Opacimeter, the reflectance over black $R_0$, and the TAPPI opacity, $C_{0.89}$, were measured on the paper. Using the Kubelka and Munk chart, the intersect of these values was located and the scattering coefficient "SX" was obtained. Also using standard procedure, the basis weight was corrected to exactly 50 pounds and the new SX value was obtained. The percent titanium dioxide was determined on the basis of the ash content of the papers. The "Pigment Efficiency Value" was then calculated according to the following formula:

$$\text{Pigment efficiency value} = \frac{SX}{\text{Percent } TiO_2 \text{ in sheet}}$$

The pure $TiO_2$, prepared by using the mechanical steps of the proces (Test No. 3 above) produced higher optical efficiency than the pure $TiO_2$ regenerated from the original black liquor (Test No. 1).

The treated $TiO_2$ had a higher relative hiding power (Test No. 2) as compared with the two pure $TiO_2$ pigments (Tests No. 1 and No. 3). These observations are based on the values for the opacity of the sheets allowing for the $TiO_2$ contents of the various samples.

upon the specimen. The scatter slit had an opening of 4°, this being the slit which allows acceptance of the reflected and/or diffracted X-rays leaving the specimen. Scale F was used (1/8/1) with the time constant of one. The receiving head assembly is rotated relative to the incident beam at a rate of 2° per minute. The strip chart is pulled past the pen at such a rate that 4° of receiver head movement occurs during each inch of chart movement (abscissa of the graph). The diagrams of FIGS. 1–3 were reduced to about one-half the original size.

Numerical values assigned to each peak represent the distance between parallel planes within the crystal in angstrom units. They are arrived at from Bragg's Law using the equation $$D = \frac{\lambda}{2 \sin \theta}$$

where $\lambda$ = wave length of the rays;
$D$ = distance between the atomic planes; and
$\theta$ = angle of incidence of the rays.

The wave length of copper $K\alpha$ is 1.54 A. and in this case the equation reduces to $$D = \frac{1.54}{2 \sin \theta}$$

It will be observed that the diffractometer measures $2\theta$.

In FIG. 1 (the product of Test No. 3 of Example 2) all of the peaks are identified as due to $TiO_2$ present as rutile as the major component and anatase as the minor component. In FIG. 2 (the product of Test No. 2 of Example 2) it is evident that the product also contains $TiO_2$ as rutile in significant amount. No barium sulfate as such was detected, indicating that the $BaSO_4$ determined by assay was tied up in some form of a complex.

There are a number of unidentified lines which do not correspond to any calcium-silicon-oxygen compound. In FIG. 3 (the product of Example 3) the diagram also indicates large amounts of $TiO_2$ as rutile. $BaSO_4$ is the other major component of this material. Unidentified lines are also present. These data indicate that in the case of FIG. 2 (80% $TiO_2$) and FIG. 3 (38% $TiO_2$), the compounds are true complexes of CaO, $SiO_2$ and $BaSO_4$ present together with the $TiO_2$.

EXAMPLES 4–9

Referring to FIGS. 4 to 6 which illustrate the design and use of equipment suitable for making the compositions of $TiO_2$ on a commercial scale, the following procedures were carried out in the apparatus shown. A portion of a casing of a suitable centrifugal pump 10 having an inlet 11, a discharge 12, and an impeller 15 rotating about an axis 16 is shown in FIG. 4. In FIG. 5 there is shown on an enlarged scale an inlet pipe 20 attached to the pump casing 10 at 21. Closely adjacent to the connection 21 there is a Y 22 having two branches 25 and 26. The pump may suitably be a closed impeller pump such as Ingersoll-Rand Motor Pump Model 20RVL–5 having a capacity of 150 g.p.m. at a 52 ft. head, an impeller diameter of 11 inches, and a power input of 5 HP. at 1150 r.p.m.

In carrying out the procedure of the invention, a solution A, which is the titanyl sulfate, and is at a temperature of 140° F. is introduced at the inlet 11. Solution B introduced through the connection 21 is the alkaline solution at a temperature of 200° F. Following the procedure described in Example 1 the following additional Examples 4, 5, 6, 7, 8 and 9 were carried out by simultaneously introducing an acid titanyl sulfate solution at 11 and a mixture of sodium hydroxide solution and barium chloride solution through the Y connection 22 and into the pipe connection 20. In Example 9 no $BaCl_2$ was added. A product consisting of a slurry of the precipitated pigment in the aqueous mother liquor was removed from the pump at 12 and treated to separate the precipitated pigment, after which it was dried and calcined as described above. The products of Examples 4 to 9 contained the following respective amounts of $TiO_2$ (the remainder being CaO, $SiO_2$ and $BaSO_4$): 100%, 95%, 80%, 5%, 40% and 40%. The reaction conditions and the properties of the product are set forth in the following table.

EXAMPLE 10

Aqueous suspensions were prepared from a number of pigments and the percentage of transmission of light at 500 microns was measured for each such suspensions to determine the opacity of each of the particular pigments. Pigment A was an anatase pigment of a commercial grade known as "Rayox RG." It had an average particle size of about 0.25 micron. Pigment B was a type of clay sold commercially under the name "Spray-Satin." It is a No. 1 fraction coating grade of kaolinite (the finest grade) having an average particle size of about 0.5 micron. Pigment C was titanic acid ($H_2TiO_3$) obtained by the sulfuric acid process and calcined but without being seeded with rutile $TiO_2$. It was prepared in Example 2, Test 3 above. Pigment D was the extended pigment containing 38% $TiO_2$ prepared in Example 3 above. Pigment E was the 80% $TiO_2$ pigment prepared in Example 2, Test 2.

Each of the pigments A through E after being wet-ground in a ball mill was made up in the following concentrations:

0.01 gm./liter
0.05 gm./liter
0.10 gm./liter
0.14 gm./liter

These were then measured on the Bausch & Lomb "Spectronic 20" colorimeter at 500 microns wave length. Standard Bausch & Lomb selected test tubes were used to contain the dispersions during all measurements. The results of such measurements are plotted on FIG. 7 which is a semi-log graph as a function of the concentration of the particular dispersion.

It has been established that relatively dilute suspensions of titanium dioxide pigments follow the Beer-Lambert Law, i.e., the relationship between the logarithm of the light transmitted through the dispersion and the concentration of the dispersion is a straight line over the measurable limits of the instrument. Therefore, by plotting the logarithm of the percent transmittance versus the concentration, a straight line is obtained. All the lines extrapolated to one common pont (100% transmission at zero percent pigment dispersion). The curves with the greater slope have the greater opacity per unit of pigment (since they allow less transmission). The rela-

TABLE II

Figure 7:
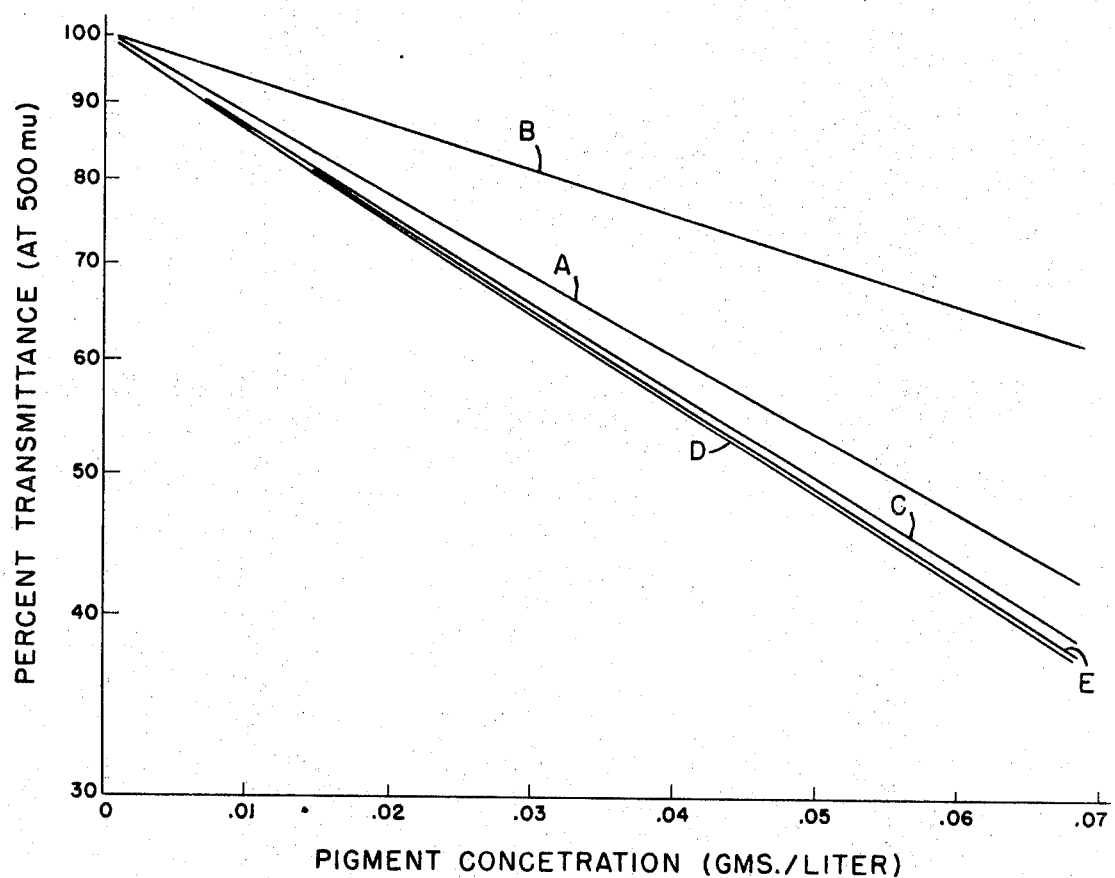
FIG. 7 is a diagram showing light absorption of water suspensions made according to the invention.

| Final titanium dioxide—complex mixture | Example 4 100% $TiO_2$ (No complex) | | Example 5 95% $TiO_2$, 5% added | Example 6 80% $TiO_2$, 20% added | | Example 7 5% $TiO_2$, 95% added | Example 8 40% $TiO_2$, 60% added | | Example 9 40% $TiO_2$, 60% added (No barium) | |
|---|---|---|---|---|---|---|---|---|---|---|
| Amounts of chemicals used in preparation (according to system given to the right) | For 100 lb. calcined yield | For 150 g.p.m. production | For 100 lb. $TiO_2$ calcined yield | For 100 lb. $TiO_2$ calcined yield | For 150 g.p.m. $TiO_2$ production | For 100 lb. $TiO_2$ calcined yield | For 100 lb. $TiO_2$ calcined yield | For 150 g.p.m. $TiO_2$ production | For 100 lb. $TiO_2$ calcined yield | For 150 g.p.m. $TiO_2$ production |
| Titanyl sulfate (0.1060 gms. $TiO_2$/ml.); gallons | 113 | 9.0 | 113 | 113 | 9.0 | 113 | 113 | 9.0 | 113 | 9.0 |
| Dilution water for titanly sulfate; gallons | 987 | 81 | 987 | 987 | 81 | 987 | 987 | 81 | 987 | 81 |
| Sodium Silicate: | | | | | | | | | | |
| Dry $Na_2O.38SiO_2$, (lbs.) | | | 3.7 | 17.8 | 1.5 | 1,352 | 107 | 8.8 | 114 | 17.0 |
| Gal. of 18.75% solution | | | 2.4 | 11.5 | 0.95 | 873 | 69 | 5.7 | 138 | 11.4 |
| Calcium Chloride: | | | | | | | | | | |
| Dry $CaCl_2$, pounds | | | 0.97 | 4.7 | 0.39 | 354 | 28 | 2.3 | 56 | 4.6 |
| Gal. of 10% solution | | | 1.2 | 5.7 | 0.47 | 437 | 34.5 | 2.8 | 69 | 5.6 |
| Barium Chloride: | | | | | | | | | | |
| Dry $BaCl_2$, pounds | | | 2.3 | 11.1 | 0.93 | 843 | 66.6 | 5.5 | | |
| Gal. of 10% solution | | | 2.8 | 13.5 | 1.1 | 1,025 | 81 | 6.7 | | |
| Sodium Hydroxide: | | | | | | | | | | |
| Dry NaOH, pounds | 1,200 | 100 | 1,200 | 1,200 | 100 | 1,200 | 1,200 | 100 | 1,200 | 100 |
| Gal. of 5 normal solution | 720 | 60 | 720 | 720 | 60 | 720 | 720 | 60 | 720 | 60 |
| Total yield (pounds): | | | | | | | | | | |
| $H_2TiO_3$ | 123 | 10.1 | 123 | 123 | 10.1 | 123 | 123 | 10.1 | 123 | 10.1 |
| Complex {$BaSO_4$ | | | 2.6 | 12.5 | 1.02 | 950 | 75 | 6.17 | | |
| {$CaO.4SiO_2.3H_2O$ | | | 3.1 | 14.9 | 1.22 | 1,132 | 89.4 | 7.35 | 178.8 | 15.7 |
| Calcined yield (pounds): | | | | | | | | | | |
| $TiO_2$ | 100 | 8.23 | 100 | 100 | 8.23 | 100 | 100 | 8.23 | 100 | 8.23 |
| Complex {$BaSO_4$ | | | 2.6 | 12.5 | 1.02 | 950 | 75 | 6.17 | | |
| {$CaO.4SiO_2$ | | | 2.6 | 12.5 | 1.02 | 950 | 75 | 6.17 | 150 | 12.4 | tive opacifying powers of the pigments, therefore, can be determined by measuring the relative slopes of the curves as shown in FIG. 7. It will be observed from FIG. 7 that the product of Examples 2 and 3, that is those containing 80% $TiO_2$ and 38% $TiO_2$, respectively, had a significantly better opacity than pure anatase and clay. Sample C, which was 100% $TiO_2$ prepared by the procedure of Example 2, also showed a significantly higher opacity than the pure anatase.

Although the uses of the compositions and methods of the invention have been illustrated in connection with the manufacture of paper, they are also useful in the manufacture of elastomeric products such as rubber as a pigment and/or filler, in the manufacture of paint as a pigment and/or extender, and in still other products.

I claim:

1. A complex composition consisting essentially of $TiO_2$, $SiO_2$ and CaO made by co-precipitation from an acid solution of titanyl sulfate containing silicate and calcium ions dissolved therein, by mixing such solution with an alkaline solution under conditions of high shear, the ratio $SiO_2$:CaO being at least about 3:1 and no greater than 4:1 and the amount of $TiO_2$ being in the range of about 5% to 40% by weight.

2. A composition as described in claim 1 in which the average particle size of the complex is in the range from about 0.15 to 0.50 micron.

3. A composition as described in claim 1 filtered and calcined at a temperature between about 1600 and 1800° F., in which the $TiO_2$ is predominantly in the form of rutile.

4. A composition as described in claim 1 in which the amount of $TiO_2$ is in the range of about 30% to 40%.

5. An aqueous acid solution of titanyl sulfate containing silicate and calcium ions dissolved therein, said solution upon neutralization precipitating a complex of $TiO_2$, $SiO_2$ and CaO, the silicon and calcium being present in the ratio of at least about 3:1 and no greater than 4:1 equivalent to $SiO_2$:CaO, and said composition containing about 5% to 40% by weight of $TiO_2$.

6. The composition described in claim 5 in which the $TiO_2$ equivalent of the titanium present is about 5% to 40% by weight of the total of the CaO and $SiO_2$ equivalent of the calcium and silicon in solution.

7. The method of preparing the solution described in claim 5, which comprises adding $Na_2O \cdot SiO_2$ and $CaCl_2$ in molar proportions of from 3:1 to 4:1 to a strongly acid solution of titanyl sulfate and mixing, the concentration, acidity and temperature of the solution being sufficient to maintain the calcium and silicate ions in solution, and the titanyl sulfate being present in a quantity sufficient to provide 5% to 40% by weight of $TiO_2$ in the precipitated complex.

8. The method of producing a complex composition consisting essentially of $TiO_2$, $SiO_2$ and CaO, which comprises introducing into the high shear zone adjacent a rapidly rotating impeller an aqueous acid solution of titanyl sulfate in an amount sufficient to provide from 5% to 40% by weight $TiO_2$ in the precipitated complex and containing silicate and calcium ions in proportions of from 3:1 to 4:1 dissolved therein, simultaneously introducing into said zone an aqueous solution of an alkali metal hydroxide in an amount sufficient at least substantially to neutralize said titanyl sulfate solution and precipitate said complex, and withdrawing from said zone effluent containing said precipitated complex.

9. The method of claim 8 in which said titanyl sulfate solution and said alkaline solution are mixed in the high shear zone adjacent the impeller of a centrifugal pump by continuously introducing said solutions to said zone.

10. The method of claim 8 in which the titanyl sulfate solution is kept below its hydrolysis temperature until it reaches said high shear zone.

11. The method of claim 10 in which the pH of the resulting mixed solutions is about 8–10.

12. The method of claim 8 in which the temperature of the mixed solutions is about 100–212° F.

13. The method of claim 12 in which the temperature of the mixed solutions is at least about 170° F.

References Cited

UNITED STATES PATENTS

| | | | |
|---|---|---|---|
| 2,259,481 | 10/1941 | Mowlds | 106—300 XR |
| 2,259,482 | 10/1941 | Mowlds | 106—300 XR |
| 2,296,618 | 9/1942 | Patterson | 106—300 |
| 2,296,639 | 9/1942 | Hanahan. | |
| 2,378,790 | 6/1945 | Robertson. | |
| 2,674,541 | 4/1954 | Wainer | 106—300 |
| 2,751,307 | 6/1956 | Armant et al. | |
| 2,760,880 | 8/1956 | Grave | 106—300 |
| 3,034,913 | 5/1962 | Lagerstrom | 106—300 XR |
| 3,334,059 | 8/1967 | Rodgers et al. | 106—300 XR |

FOREIGN PATENTS 476,439   8/1951   Canada.

TOBIAS E. LEVOW, Primary Examiner

H. M. S. SNEED, Assistant Examiner

U.S. Cl. X.R.

23—202; 106—288, 306

UNITED STATES PATENT OFFICE
CERTIFICATE OF CORRECTION

Patent No. 3,528,836    Dated September 15, 1970

Inventor(s) William L. Craig

It is certified that error appears in the above-identified patent and that said Letters Patent are hereby corrected as shown below:

Column 3, line 58, "carried" should read -- varied --. Column 5, line 50, after "of", first occurrence, insert -- the --. Column 6, line 39, "acid" should read -- aid --; line 54, "$Na_2.03.25$" should read -- $Na_2O.3.25$ --. Column 7, line 12, "Hańdshets" should read -- Hańdsheets --; Table I, Subcolumn 3, line 38, "88.0" should read -- 88.4 --; Table I, Subcolumn 3, line 39, ".724" should read -- .720 --; line 68, "proces" should read -- process --. Column 9, line 12, insert "complex" after -- the --; Table II, Subcolumn 1, line 61, "Dilution water for titanly sulfate; gallons" should read -- Dilution water for titanyl sulfate; gallons --; Table II, Subcolumn 1, line 63, "$Na_2O.38SiO_2$" should read -- $Na_2O.3.8SiO_2$ --. Column 10, line 43, "pont" should read -- point --; Table II, Subcolumn 9, line 81, "12.4" should read -- 12.34 --.

Signed and sealed this 8th day of June 1971.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,528,836          Dated September 15, 1970

Inventor(s) William L. Craig

It is certified that error appears in the above-identified patent and that said Letters Patent are hereby corrected as shown below:

Table II, Subcolumn 9, line 63, "17.0" should be -- 17.6--.

Signed and sealed this 17th day of August 1971.

(SEAL)
Attest:

EDWARD M.FLETCHER,JR.          WILLIAM E. SCHUYLER, JR.
Attesting Officer                Commissioner of Patents

PO-1050
(5/69)

UNITED STATES PATENT OFFICE
CERTIFICATE OF CORRECTION

Patent No. 3,528,836      Dated September 15, 1970

Inventor(s) WILLIAM L. CRAIG

It is certified that error appears in the above-identified patent and that said Letters Patent are hereby corrected as shown below:

<u>Column 6, lines 12 and 13</u>, delete sentence reading "The following physical and chemical properties were determined in the product:" and substitute therefor:

-- The properties indicated in the following table are those of the uncalcined pigment before the refinement procedure. --

Signed and sealed this 30th day of November 1971.

(SEAL)
Attest:

EDWARD M. FLETCHER, JR.
Attesting Officer

ROBERT GOTTSCHALK
Acting Commissioner of Patents